United States Patent [19]

Shaw et al.

[11] 3,922,670

[45] Nov. 25, 1975

[54] DIGITAL SYSTEM PROVIDING SIGNALS REPRESENTATIVE OF FREQUENCY VARIATIONS FROM A NOMINAL FREQUENCY

[75] Inventors: Benjamin Chandler Shaw, Granada Hills; Rex John Crookshanks, Palos Verdes Estates, both of Calif.

[73] Assignee: The Bendix Corporation, North Hollywood, Calif.

[22] Filed: Dec. 5, 1973

[21] Appl. No.: 421,886

Related U.S. Application Data

[63] Continuation of Ser. No. 240,414, April 3, 1972, abandoned.

[52] U.S. Cl. .............. 340/347 R; 324/186; 324/187; 324/78 D; 235/92 TF

[51] Int. Cl.² ........................................ H03K 13/00

[58] Field of Search .................. 324/186, 187, 78 D; 235/92 TF; 340/347 R

[56] References Cited

UNITED STATES PATENTS

| | | | |
|---|---|---|---|
| 3,296,525 | 1/1967 | Sakuma | 324/186 X |
| 3,663,885 | 5/1972 | Stewart | 324/186 X |

*Primary Examiner*—Charles D. Miller
*Attorney, Agent, or Firm*—Robert C. Smith; William F. Thornton

[57] ABSTRACT

A number of embodiments are described which include means for receiving signals of unknown frequency to be compared with a reference signal of much higher frequency having a known relationship with a carrier frequency and for providing output signals which vary with the difference in frequency between the unknown and carrier frequencies. The unknown frequency is supplied to an axis crossing detector which produces a pulse output varying in frequency with the unknown signal and which is supplied to a flip-flop or binary dividing circuit. The flip-flop, in turn, operates gating means through which the reference frequency is supplied to counters which store counts of the reference frequency during each cycle. In one embodiment there are two counters, each of which alternately stores counts of one cycle as the other is gated to supply the count to an output device. In a second embodiment, additional means are provided to eliminate a minimum count and over-range counts. A still further embodiment provides most of the functions of the second embodiment, but simplifies the structure by using the initial counts of a new cycle to cause the main counter to discharge its count to the output, reset to zero, and to begin accumulating counts for the next cycle, thus enabling the main counter to store counts for all cycles rather than only alternate cycles. The output count may be utilized directly in a digital indicator or other utilization device or may be converted to an analog voltage proportional to the count by means of a digital-to-analog converter.

6 Claims, 5 Drawing Figures

DIGITAL SYSTEM PROVIDING SIGNALS REPRESENTATIVE OF FREQUENCY VARIATIONS FROM A NOMINAL FREQUENCY

This is a continuation of Application Ser. No. 240,414 filed Apr. 3, 1972 now abandoned.

BACKGROUND OF THE INVENTION

There are a number of applications in which it is desired to compare an unknown frequency with a known frequency and provide an output reflecting a difference in frequency between the unknown signal and the signal of known frequency. One application for this technique is in sonar systems to aid in distinguishing reflections received from moving objects from those emanating from stationary objects. Typically, a sonar system will, in the course of echo ranging, emit a series of pulses consisting of many cycles of a high frequency signal. Thus, a sonar pulse may be of the order of 30 milliseconds in length consisting of a substantial number of cycles of a carrier frequency which may be of the order of 10 kilocycles. When this pulse is reflected from an object and returned to the sonar transducer, variations in the frequency of the carrier may be sensed to provide an almost instantaneous indication of a moving target. One system for accomplishing this result is shown in U.S. Pat. No. 3,384,818 issued in the name of Ernest P. Longerich, Donald J. O'Brien and Erland W. Rudy, common assignee. This patented system uses a phase slope network with a delay line consisting of a series of resonant circuits. This delay line constitutes a comparatively large, heavy and expensive component. In such a system, the received signal is supplied to the phase slope network where it is delayed a fixed period of time and is then compared with itself. Obviously it is desirable to have as long a line as possible in order to get a maximum delay and greater sensitivity so long as the delay is significantly shorter than the overall pulse length so that the comparison can take place. Thus, the longer the delay, the better the frequency error signals but also the larger the delay line with its corresponding penalties in size, weight and cost.

Another disadvantage is that the longer the delay line, the more necessary it is that the individual components be very stable and the more difficult it is in actual production to provide sufficiently stable components.

Another approach which has been used for this application is that of a phase-locked loop. This is a well established design technique which can be implemented with relatively few components and therefore avoids some of the size and cost disadvantages of the delay line referred to above. This approach, however, is vulnerable to instability of components and offers little advantage in discrimination against noise so that both the stability and the noise performance of the phase-locked loop arrangement were considered questionable.

SUMMARY OF THE INVENTION

The disadvantages of the above, which are essentially analog techniques, may be largely overcome through the use of a digital technique which reduces dependency upon extreme stability of components. In applicant's system the input signal, which may consist of both short and longer pulses of a carrier having a frequency, either directly or by heterodyne translation from some higher carrier frequency, such as 2KHz, and which is subject to frequency variations for such reasons as Doppler effect, is supplied to a circuit which produces a single pulse output for each cycle of input signal, and these pulses are used to drive a flip-flop binary divider. The flip-flop output consists of a series of pulses of the length of each cycle which are used to control the timing cycle during which pulses of a much higher reference frequency, such as 2MHz, are counted and stored. As the next input cycle is counted, the previously stored counts are supplied to the output which may be a digital utilization device or a digital-to-analog converter.

In some applications it is necessary to deal with noise in the input signal, and also it is known that no useful input information can be outside of a given frequency range. For these applications, means are provided for discarding all reference cycles below a frequency known to represent the lowest frequency of useful information as well as discarding input pulses containing cycles in numbers above that containing useful information since such pulses will be largely noise. A main counter is caused to store only those counts in excess of the minimum through the use of means such as a minimum counter or a multivibrator which switches state on the occurrence of the minimum count to cause only counts above the minimum to be stored in the main counter. Over-range counts are ignored through the use of gating means which causes the counter to stop accumulating counts when the maximum count is reached and which then may withhold the stored count from being switched to the output until after the counter has been reset to zero for a new pulse count.

DESCRIPTION OF THE PREFERRED EMBODIMENTS

Figure 1:
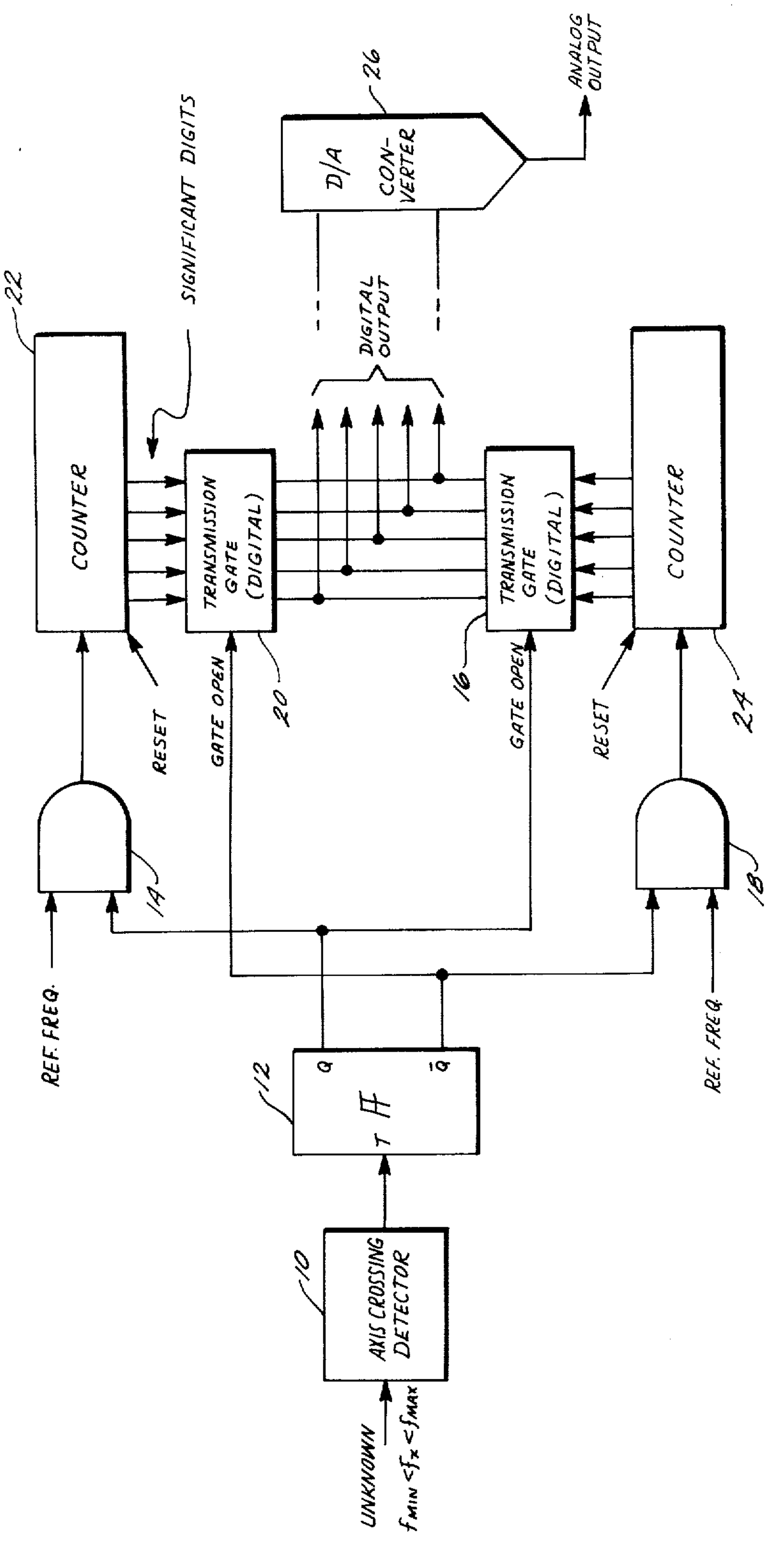
FIG. 1 is a block diagram of our frequency measuring system in its fundamental form.
Figure 1A:
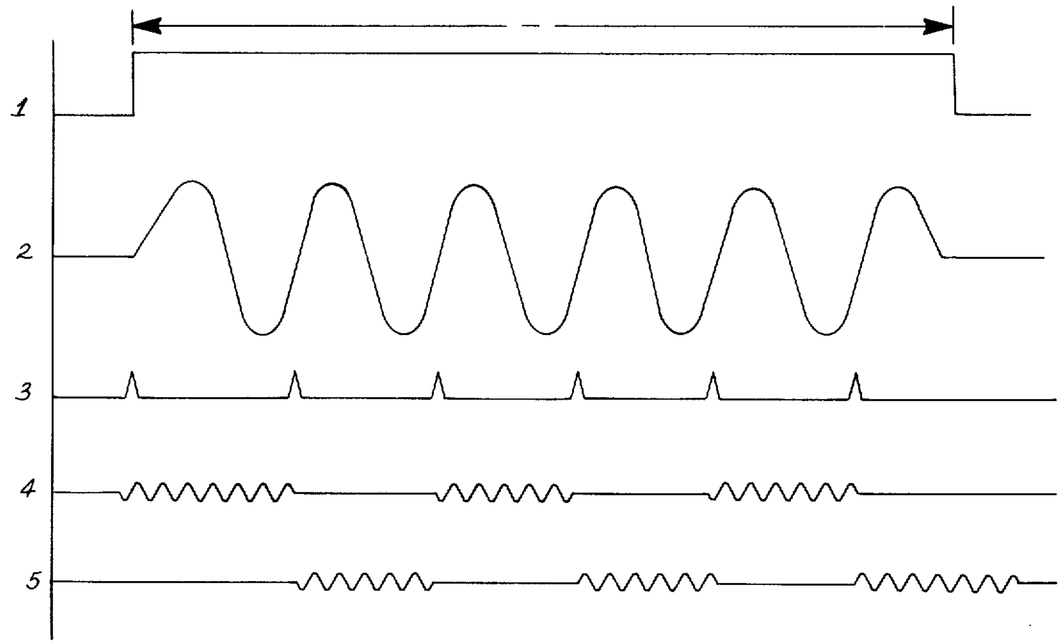
FIG. 1a is a series of graphical representations of waveforms appearing at various points in the devices of FIGS. 1 and 2.

Referring now to FIG. 1, an electrical alternating current of unknown frequency $f_x$, but which frequency is known to be between certain defined limits, is supplied to an axis crossing detector 10 which produces a sharp pulse output with each positive crossing by $f_x$ of the zero voltage axis. A typical echo ranging sonar may generate and transmit a series of pulses, each thirty milliseconds long (see FIG. 1A, graph 1), of a carrier signal of 2KHz (see FIG. 1A, graph 2). If these transmitted pulses encounter a moving reflector, the 2KHz carrier will be increased or decreased in frequency in proportion to the relative velocity and direction of movement between the transmitting transducer and the target as is known from the Doppler effect. If there is no velocity difference, the frequency reflected will be exactly that transmitted, and the output of the zero crossing detector 10 as shown in FIG. 1A(3) will be a series of sharp pulses of a given polarity at the 2KHz frequency. If a frequency increase occurs due to velocity of the reflecting object moving toward the receiving transducer, the pulse rate will be increased and the interval between pulses decreased in proportion. Should the reflecting object be moving away from the transducer, the pulse rate will be decreased and the interval between pulses increased. Thus the interval between the pulses at the output of crossing detector 10 is proportional to the unknown frequency $f_x$.

The pulse signal from crossing detector 10 is supplied to a flip-flop circuit of the T or toggle type 12 which produces output pulses alternately at Q and Q. A pulse from Q is supplied to an AND gate 14 and to a transmission gate 16. The alternate pulse from Q is supplied to an AND gate 18 and a transmission gate 20. A known reference frequency of a value such as 1MHz is supplied to both of gates 14 and 18 but is permitted to pass through to counters 22 or 24 only when the enabling pulse from Q or Q is also present. This is shown on FIG. 1A, graphs (4) and (5), which represent the output signals from gates 14 and 18, respectively. Thus, when a pulse is present from terminal Q, the counter 22 accumulates a string of pulses of the reference frequency while the gate 16 opens to transmit a previously stored count of pulses from counter 24 to the digital output, as shown. This pulse output, the count of which is directly proportional to the unknown frequency $f_x$, may be supplied to a digital indicator or to a digital-to-analog converter 26 producing an analog output whose voltage is proportional to the number of counts stored in the counter, and hence to $f_x$. When a pulse is present at Q, gate 18 transmits pulses of the reference frequency to counter 24 which counts and stores these pulses while transmission gate 20 gates the count present in the counter 22 to the output. Thus counters 22 and 24 act to alternately store pulses of the reference frequency in an amount proportional to $f_x$ and to discharge those pulses to the output.

Figure 2:
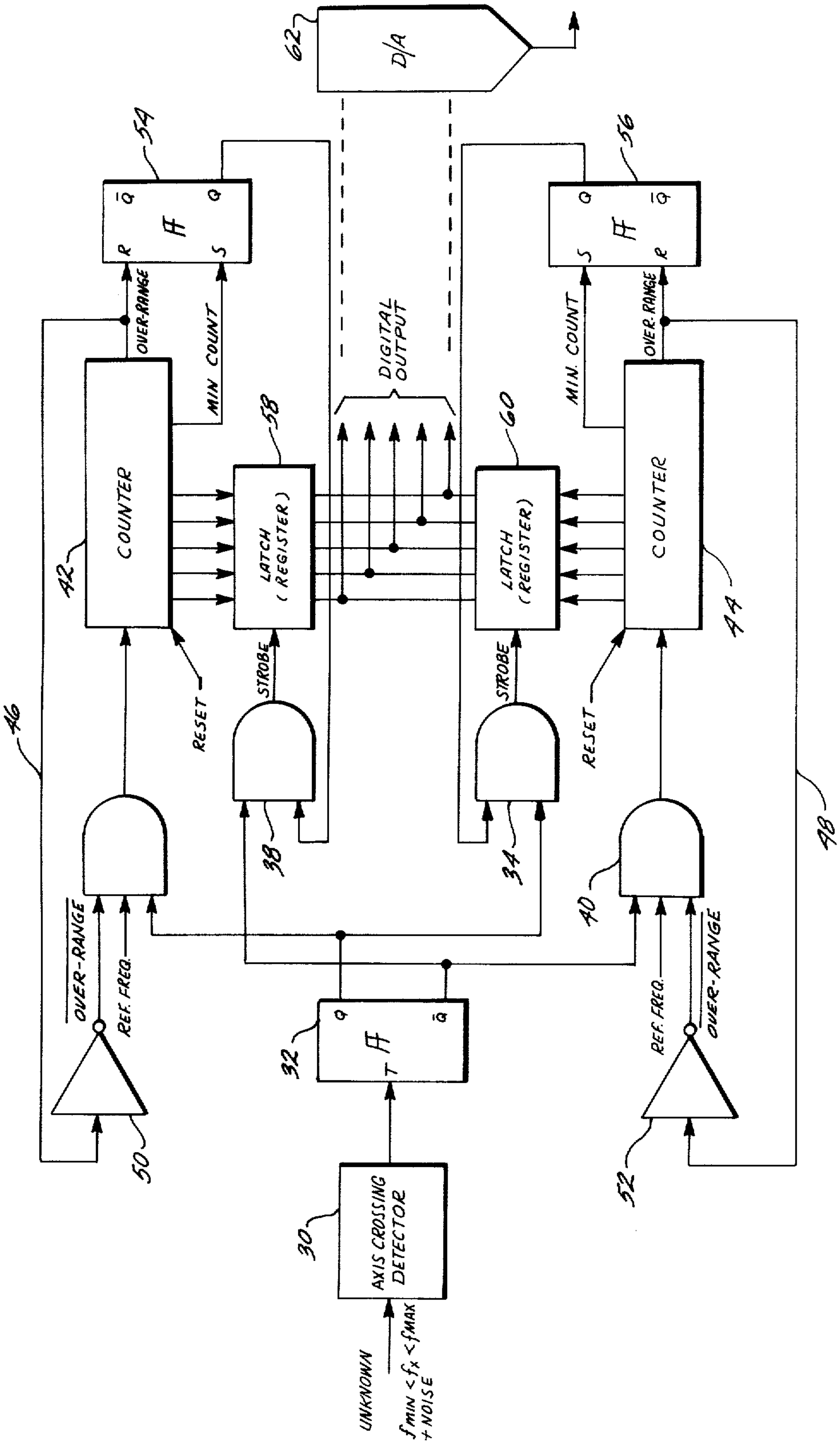
FIG. 2 is a block diagram of another embodiment of our frequency measuring system with means for limiting its response to frequencies within certain limits.

FIG. 2 is a block diagram of a system similar to that of FIG. 1, but with additional structure for limiting the output to values within a given range. In the case of a sonar application, much noise will be present in received signals, a large part of which is above or below the frequency range of any useful information. Thus the return signal from the 2KHz carrier would have a 500-microsecond period and be subject to Doppler variations between, for example, 450 microseconds and 550 microseconds. This Doppler variable signal is counted by means of the much higher frequency reference signal, and frequency differences may then be determined over a range of 100 cycles of the reference. It thus becomes possible to discard all of the counted pulses below the minimum amount, such as 450 cycles. As the clock or reference frequency is compared with the received frequency, there is a range of counts, or count differential, between zero and 100. This output can then be supplied to a digital-to-analog converter in such a way that zero represents −5 volts and 100 counts represent +5 volts. Thus the output would cross zero volts at 50 counts. Since zero volts represents zero Doppler or velocity change, a simple threshold-responsive circuit can eliminate voltages below a given value which would represent velocities too slow to be of interest.

As in the case of FIG. 1, the unknown frequency $f_x$ is supplied to an axis crossing detector 30 which produces a gating pulse to a flip-flop 32 in the same manner as in the device of FIG. 1. The output of flip-flop 32, again, is a pulse either at Q or at Q, the length being determined by the frequency of the unknown signal. Then pulses are supplied from Q to a two-input AND gate 34 and to a three-input AND gate 36. Alternately, a pulse at Q is supplied to a two-input AND gate 38 and a three-input AND gate 40. The Q and Q pulses operate in the same manner as described above to provide alternate strings of pulses of the reference frequency to counters 42 and 44 which alternately store and feed out these pulses. Should there be an excessive or overrange count supplied to either of the counters, a signal will be supplied to one of two R-S type flip-flop circuits 54 and 56 and also fed back on lines 46 or 48 to either of a pair of inverters 50 and 52 which, after inverting the signal, will supply it to gates 36 and 40 causing them to stop delivering the reference frequency to the counters.

Counters 42 and 44 also differ from counters 22 and 24 in that during their counting cycle they supply input pulses to the number of the minimum count (450 cycles) to the S terminal of either of flip-flop circuits 54 and 56, and these circuits respond to this count by causing an output at terminal Q to conduct to thereby place an enabling signal on one terminal of AND gates 34 or 38. These gates will not, at this point, cause the latch circuits 58 or 60 to conduct because there is not the required signal at the second input. Thus, if a signal is supplied from terminal Q of flip-flop 54, it will not cause gate 38 to conduct because the Q signal from flip-flop 32 is not also present and will not be present until counter 42 has finished counting. If the count is within the desired range, the counters 42 and 44 will then store the counts above the minimum. If an overrange count is sensed, flip-flop 54 will switch off at Q and cause gate 36 to stop supplying pulses to counter 42, as described. Counter 42 will then hold the maximum count until reset for a new cycle. The reset signal could come from a number of sources, but the output of the axis crossing detector 30 is useful for this purpose. This causes the overrange count to be ignored by the system.

During the time that counter 42 is accumulating a true count, the latch circuit 60 will switch the count accumulated in the previous cycle in counter 44 to the digital output or the digital-to-analog converter 62, in essentially the same manner as described with respect to the FIG. 1 embodiment. For latch 60 to conduct, it must be turned on by gate 34 which responds only to both of the signals at terminals Q of flip-flop 32 and 56 being supplied simultaneously.

Figure 3:
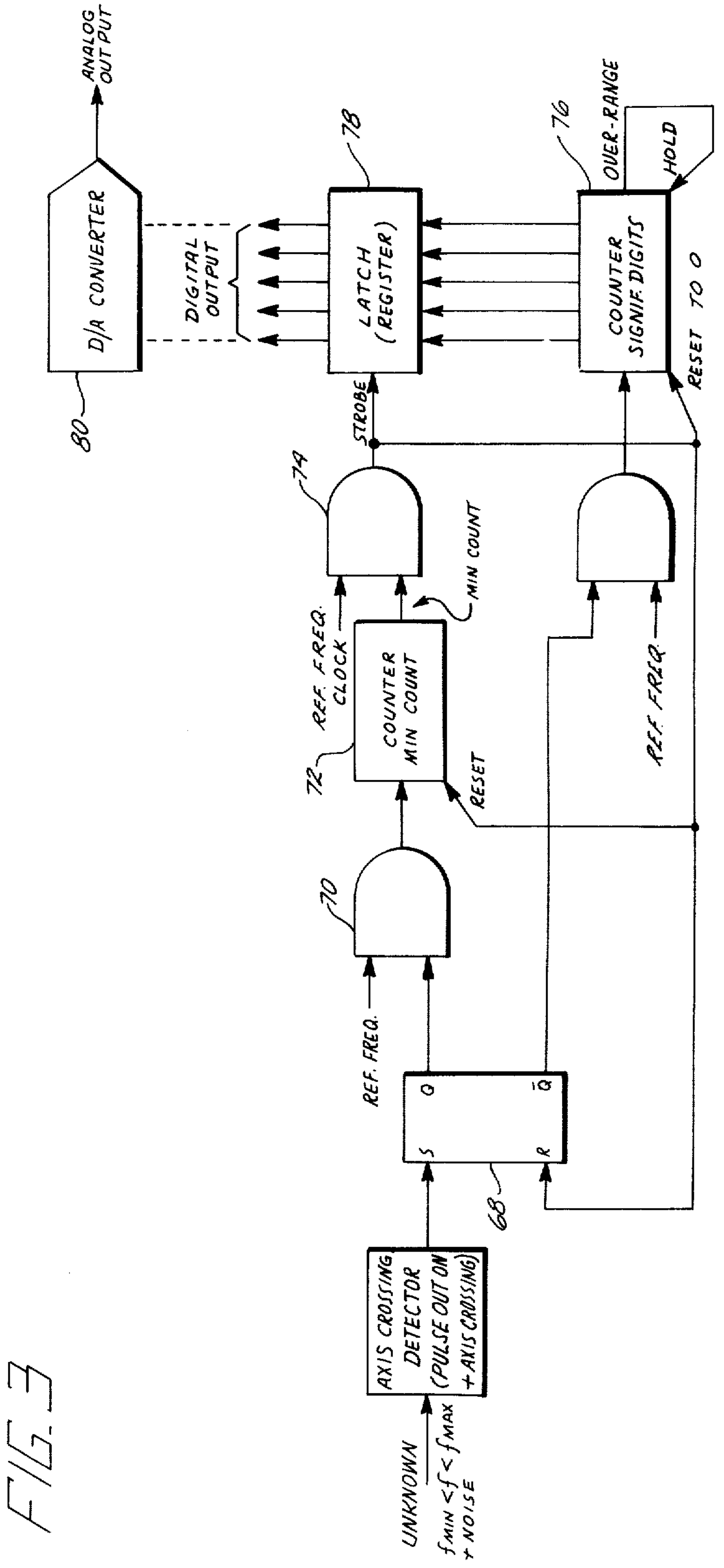
FIG. 3 is a block diagram of another embodiment of our frequency measuring system having the response limiting means of FIG. 2 but with a somewhat simplified structure.

The system of FIG. 3 provides essentially the same output characteristics as does the FIG. 2 system, but with a substantially reduced number of components. The unknown signal $f_x$ is supplied to an axis crossing detector 66 which produces a pulse output as described to the S terminal of an R-S type flip-flop 68. Any pulse received at S will make an output at terminal Q which causes a gate 70 to connect the pulses from the reference frequency source to the minimum counter 72. When counter 72 reaches the minimum count, it provides an output to a gate 74 which is also connected to receive the reference frequency pulses. The initial counts above the minimum count operate to cause the latch circuit 78 to connect the existing count in main counter 76 to the output and to reset the main counter 76 and the minimum counter 72 to zero. They also constitute an input signal to terminal R of flip-flop 68 which switches its output from Q to Q which enables a gate 79 and causes main counter 76 to begin counting and storing the reference frequency pulses. This count is accumulated in counter 76 until the next output of the axis crossing detector which will reset flip-flop 68 to Q, turning off Q which stops counter 76; or, if an over-range count is sensed, it enables a hold input and causes the counter 76 to hold at maximum count value.

With a minimum count accumulated after the next pulse from detector 66, the output of gate 74 strobes or switches the latch 78 to transfer the maximum count from main counter 76 to the output. In this case the over-range signal is simply kept at maximum value and allowed to pass, rather than eliminating it as in the FIG. 2 system. Should it be desired to eliminate this group of pulses, this can be easily implemented. As an example, gate 74 could be replaced with a three-input gate such as that shown in FIG. 2 at numerals 36 or 40 which would be connected in much the same way to inhibit the strobe signal when an over-range signal is present so that the full count in counter 76 is reset to zero before the next strobe signal. It will be recognized that the systems described will provide a count representative of the length of each individual cycle of the input signal irrespective of whether the input signal is continuous or discontinuous.

Figure 4:
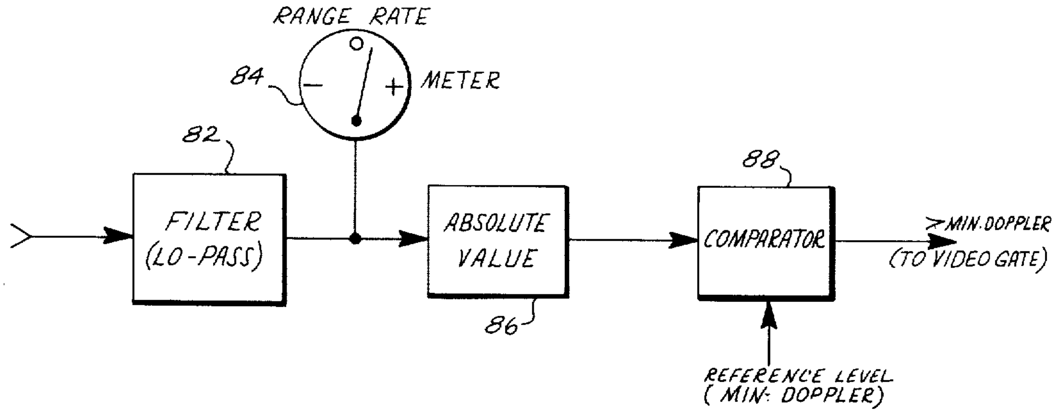
FIG. 4 is a block diagram of a simplified analog utilization system which could be used with any of the embodiments of FIGS. 1, 2 and 3.

As described above, the output of latch 78 is a digital signal which may be supplied to a digital-to-analog converter 80 to provide an analog output. It could also be supplied to a digital display and/or utilization device. A simple analog output arrangement is shown in FIG. 4 in which the analog output from digital-to-analog converter 80 is supplied to a low-pass filter 82 to remove any undesired high frequency noise and then is supplied to digital indicator 84 and to an absolute value circuit 86 which converts all the output pulses to the same effective polarity. This absolute value signal is then supplied to a digital comparator 88 in which it is compared with a reference signal representing the minimum Doppler effect which it is desired to display. Frequencies above this reference frequency are then connected to an output device such as the video gate of a cathode ray tube circuit to cause the tube to be brightened.

It is recognized that many other utilization arrangements may be used. Modifications may also be made to the systems shown to adapt them to particular applications. It may be desired to include all minimum counts and to exclude all counts above a given number, or to include all counts above the minimum. It may be desired to include counts above the minimum only to the limit of a maximum count. And the external utilization device, such as the digital-to-analog converter, may also be calibrated to respond to any threshold of minimum or maximum count supplied to it. Any of the above, as well as other obvious modifications, will be recognized by those skilled in the art as within the scope of the present invention.

We claim:

1. A system for sensing deviations in frequency of an unknown signal from a nominal frequency comprising means applying said unknown signal to an axis crossing detector to provide an output signal for each complete period of said unknown signal, first and second gate means receiving a reference frequency signal, electrical switching means producing signals responsive to said output signal for alternately enabling said gate means to conduct said reference frequency signal for the period of alternate complete cycles of said unknown signal, first and second counter means responsive to said gated reference signals for counting and storing the counts of said reference frequency signal for the period of alternate complete cycles of said unknown signal and means for resetting said counter means at the end of each said period, third and fourth gate means responsive to the enabling signals from said electrical switching means and connected to said counter means such that when said first counter means is counting cycles of said reference signals said third gate means blocks the output of said first counter and said fourth gate means conducts the accumulated count of said second counter to an external utilization device and vice versa whereby a count is made representative of the length of each complete cycle of said unknown signal.

2. A system for sensing deviations in frequency of an unknown signal from a nominal frequency as set forth in claim 1 wherein said external utilization device includes a digital-to-analog converter.

3. A system for sensing deviations in frequency of an unknown signal from a nominal frequency comprising means applying said unknown signal to an axis crossing detector to provide an output signal for each complete period of said unknown signal, first and second gate means receiving a reference frequency signal, electrical switching means producing signals responsive to said output signal for alternately enabling said gate means to conduct said reference frequency signal for the period of alternate complete cycles of said unknown signal, first and second counter means responsive to said gated reference signals for counting and storing the counts of said reference frequency signal for the period of alternate complete cycles of said unknown signal and means for resetting said counter means at the end of each said period, third and fourth gate means responsive to the enabling signals from said electrical switching means and connected to said counter means such that when said first counter means is counting cycles of said reference signals said third gate means blocks the output of said first counter and said fourth gate means conducts the accumulated count of said second counter to an external utilization device and vice versa whereby a count is made representative of the length of each complete cycle of said unknown signal, first and second flip-flop means are connected to each of said first and second counter means, fifth and sixth gate means are connected to receive signals from said first and second flip-flop means and to receive said enabling signals such that when both said flip-flop and enabling signals are present, either said fifth or said sixth gate means operates to cause the count of said first or second counter means, respectively, to be delivered to said utilization device.

4. A system for sensing deviations in frequency of an unknown signal as set forth in claim 3 wherein said first and second flip-flop means respond to the occurrence of a count in excess of a given number to cause said counter means to stop accumulating counts and to prevent the stored count from being supplied to said external utilization device prior to resetting of the counter means to receive the count.

5. A system for sensing deviations in frequency of an unknown signal from a nominal frequency comprising means applying said unknown signal to an axis crossing detector to provide an output signal for each complete period of said unknown signal, first and second gate means receiving a reference frequency signal, a minimum count counter and a main counter, an external utilization device, electrical switching means producing signals responsive to said output signal for alternately enabling said first and second gate means to alternately conduct said reference frequency signal to said minimum count counter and to said main counter, third gate means connected to said minimum count counter responsive to the occurrence of the minimum count to produce an output signal which switches said switching means from said first gate means to said second gate means, switches the existing count in said main counter to said external utilization device, and resets said main counter to zero.

6. A system for sensing deviations in frequency of an unknown signal from a nominal frequency as set forth in claim 5 wherein said external utilization device includes a digital-to-analog converter.

* * * * *